United States Patent [19]
Ryder et al.

[11] 3,942,280
[45] Mar. 9, 1976

[54] FISH LURE

[75] Inventors: Francis E. Ryder, Barrington; Michael D. Thomas, Elmhurst, both of Ill.

[73] Assignee: Ryder International Corporation, Barrington, Ill.

[22] Filed: Nov. 22, 1974

[21] Appl. No.: 526,169

[52] U.S. Cl.............................. 43/42.15; 43/42.22
[51] Int. Cl.²......................................... A01K 85/00
[58] Field of Search............ 43/42.15, 42.18, 42.22, 43/43.13

[56] References Cited
UNITED STATES PATENTS

| | | | |
|---|---|---|---|
| 1,220,921 | 3/1917 | Wilson | 43/42.22 |
| 1,545,683 | 7/1925 | Nowak | 43/42.15 |
| 1,993,114 | 3/1935 | Rasmussen | 43/43.13 |
| 2,219,886 | 10/1940 | Blomme | 43/43.13 |
| 2,595,168 | 4/1952 | Roth | 43/42.15 |
| 3,735,518 | 5/1973 | Kleine et al. | 43/42.15 |

*Primary Examiner*—Louis G. Mancene
*Assistant Examiner*—Daniel J. Leach
*Attorney, Agent, or Firm*—Olson, Trexler, Wolters, Bushnell & Fosse, Ltd.

[57] ABSTRACT

An embodiment of fish lure comprising a body which may be made up of articulated components, has a cross-section which includes a central web and flange portions, such that the fish lure is relatively lightweight, yet appears as a full-bodied fish conforming to the shape of a small bait fish upon which larger game fish feed. The fish lure may be provided with an adjustable diving plane at the head portion thereof and has a thin web and flange cross-section throughout the body portion to be pulled through the water with ease. The fish lure construction is ideally suited for use to attract large fish and can be broken down for storage.

12 Claims, 8 Drawing Figures

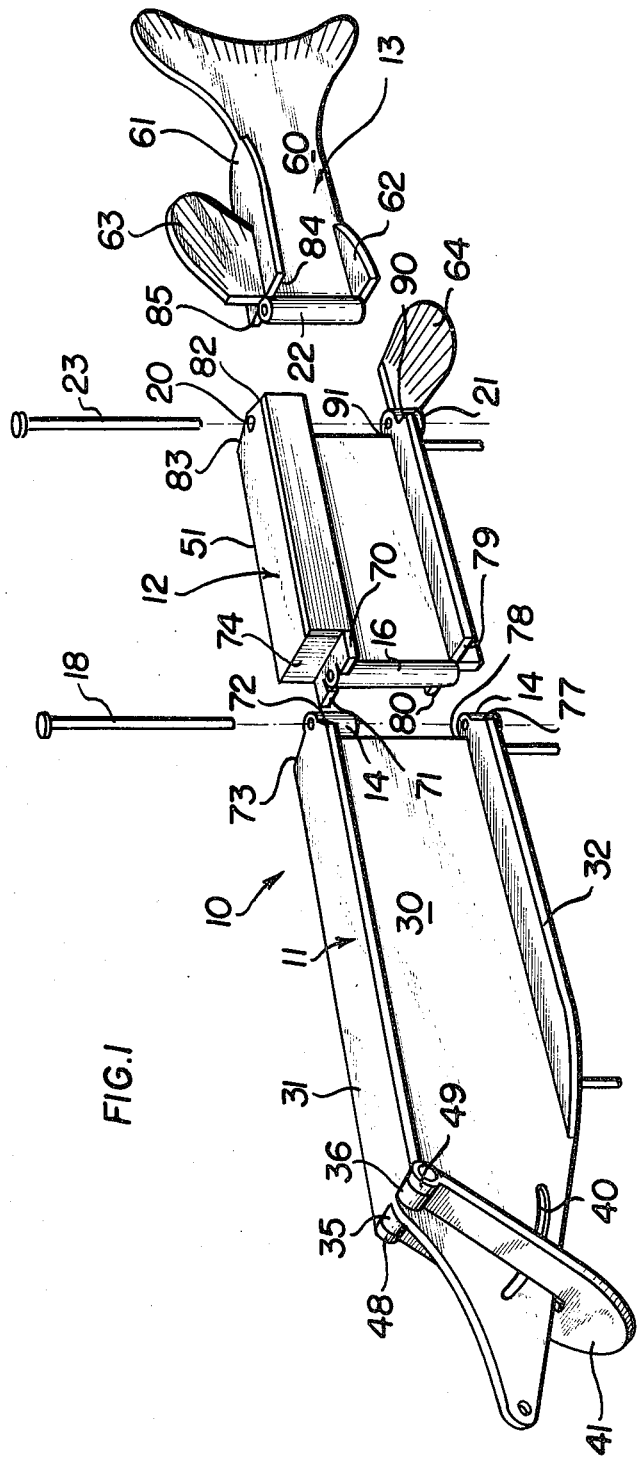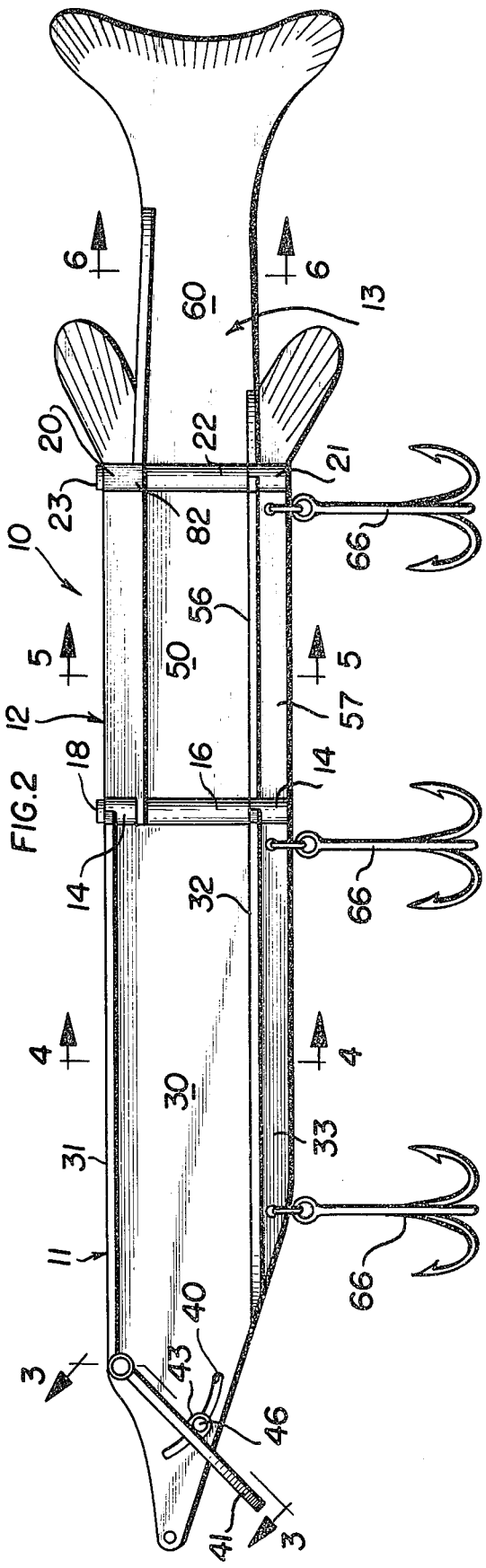

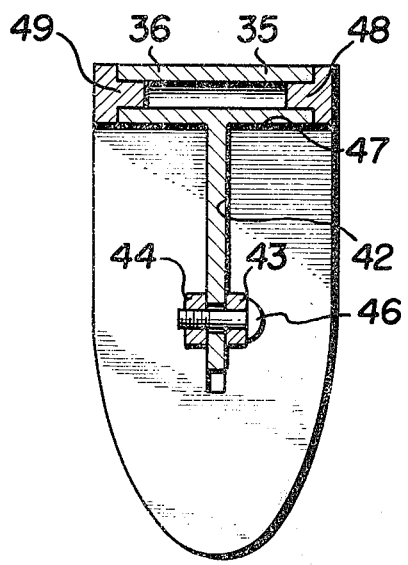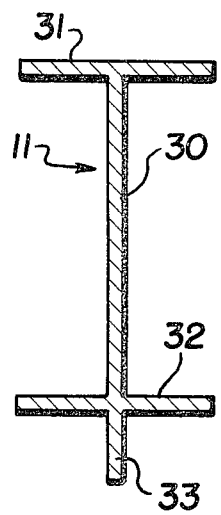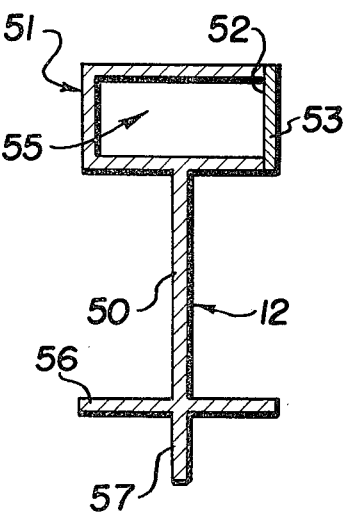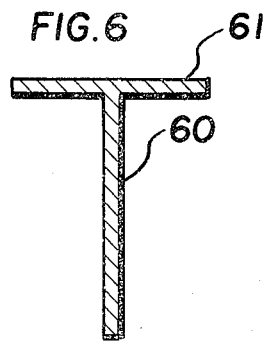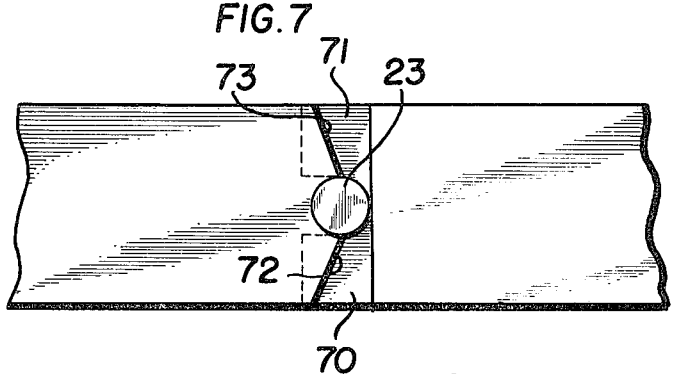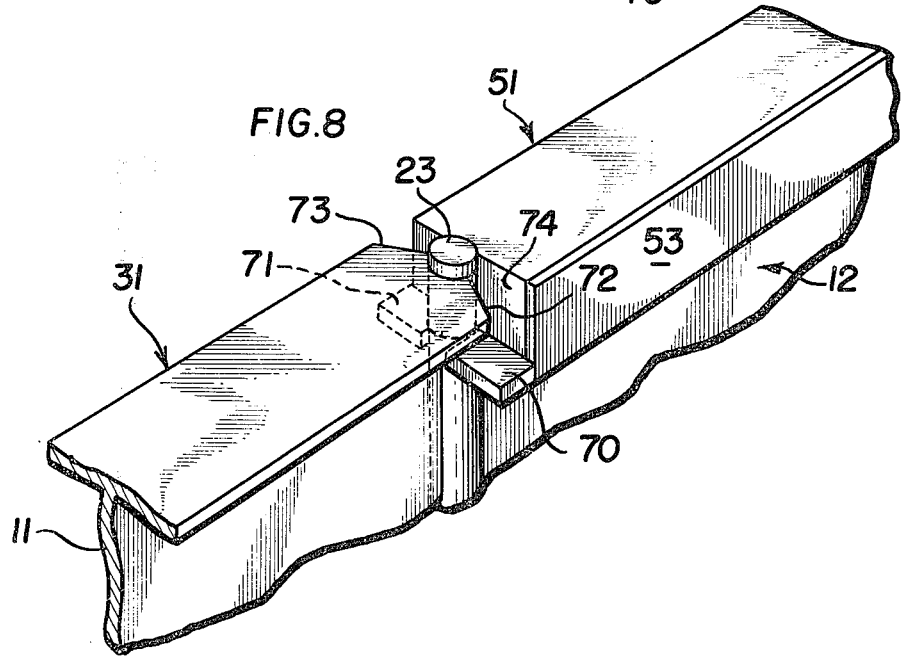

FISH LURE

BACKGROUND OF THE INVENTION

This invention relates generally to fishing lures used as bait to catch large fish, and more particularly to a fishing lure which, in and of itself, is relatively large but which is constructed in a manner to be light in weight and capable of being stored in a relatively small space.

In quest of large game fish, artificial bait is often employed, which due to the size of the fish sought must be comparatively large. However, prior art lures of sufficient size to catch large fish are relatively heavy and cumbersome to use. The are also relatively large and therefore present a problem of storing the lure when not in use. Furthermore, having a relatively large cross-section, these lures provide substantial resistance when being pulled through the water during retrieval, or may be unstable. Some prior art lures are formed of relatively thin metal or plastic, however, these lures do not give a full-bodied appearance when viewed from the top or bottom, and thus are not attractive to large game fish.

In addition, to attract large game fish, a lure must not only be realistic in appearance, but also must have a realistic action in water. Toward that end, it is known to construct a lure resembling a bait fish, from articulated members. The articulated members are arranged relative to one another so that they are free to move or undulate back and forth while the fish lure is being pulled through the water to attract a game fish. However, prior art lures have the distinct disadvantage in that at the point of articulation or pivot a gap exists between the several members of the fish lure. This gap detracts from the realistic appearance of the fish lure, and oftentimes could be the reason for game fish ignoring the lure.

A further problem, related to the provision of a lure having a realistic action in the water is that of the buoyancy of the lure, and the attitude it assumes once in the water. In this regard, the lure must move through the water in a generally horizontal position, in order to resemble a bait fish. This feature, which is generally not significant with small lures, constitutes a substantial problem with larger lure designs.

SUMMARY OF THE INVENTION

Accordingly, it is an object of this invention to provide a new and improved fish lure construction which overcomes the problems of the prior art.

Another object of this invention is to provide a fish lure construction which appears to be a full-bodied bait fish from substantially all angles of view when being pulled through the water.

It is still another object of this invention to provide a novel fish lure construction which enables the fish lure to be made relatively large while being light in weight.

Yet another object of this invention is to provide a novel fish lure construction which enables the lure to be taken apart during storage and easily reassembled when it is to be used.

Another object of this invention is to provide a novel fish lure construction which incorporates an adjustable diving plane so that the fish lure will submerge to any desired depth upon retrieval at various rates.

Briefly, the fish lure construction of this invention is preferably made of molded thermoplastic material of sufficient strength to enable a plurality of treble hooks to be fastened thereto. The overall length of the fish lure construction is capable of being about up to 18 to 20 inches long without being unduly heavy due to the novel structural techniques of this invention. The illustrated embodiment of the fish lure is a young northern pike which is intended to be bait for large trophy northern pike or muskie, as well as many other fresh and saltwater fish. The body components of the fish lure are made of molded plastic which has a generally I-beam shaped cross-section so that while the mass of the lure is small, it appears to be a full-bodied fish from substantially all viewing angles while being pulled through the water. The lure includes ballast chambers or members secured thereto to provide buoyancy to the lure. The front of the lure has a diving plane which, when pulled through the water, causes the lure to submerge against the buoyancy provided by the ballast means, as well as imparting a side-to-side oscillating motion to assimilate a swimming fish. The I-beam type cross-section configuration of the components making up the body of the fish lure provides a relatively thin cross-section to the water so that the lure offers minimum resistance when being retrieved. The fish lure as illustrated would be painted to resemble a bait fish, and in the articulated form has front and rear body portions which can be separated from one another to allow the lure to be broken down and stored in a relatively small space.

Many other objects, features and advantages of this invention will be more fully realized and understood from the following detailed description when taken in conjunction with the accompanying drawings wherein like reference numerals throughout the various views of the drawings are intended to designate similar elements or components.

BRIEF DESCRIPTION OF THE DRAWINGS

FIG. 1 is a perspective view of a disassembled fish lure constructed in accordance with the principles of this invention;

FIG. 2 is a side elevational view of the fish lure of FIG. 1;

FIG. 3 is a sectional view taken along line 3—3 of FIG. 2 and shows the diving plane incorporated in the fish lure of this invention;

FIG. 4 is a sectional view taken along line 4—4 of the fish lure of FIG. 2;

FIG. 5 is a sectional view taken along line 5—5 of FIG. 2;

FIG. 6 is a sectional view taken along line 6—6 of FIG. 2;

FIG. 7 is a fragmentary top view of the fish lure of FIG. 2 illustrating the overlapping articulation joint; and FIG. 8 is a fragmentary perspective view illustrating the articulation joint and the flotation chamber formed in the rear body portion of the fish lure.

DETAILED DESCRIPTION OF THE ILLUSTRATED EMBODIMENT

Referring now to the drawings, a fish lure is constructed in accordance with the principles of this invention and designated generally by reference numeral 10. The fish lure 10 includes a front body portion 11, a rear body portion 12 and a tail portion 13. The front body portion 11 is provided with spaced apart hinge boss portions 14 located substantially centrally of the vertical axis of the fish body. A hinge boss portion 16 is formed on the rear body portion 12 and placed in alignment with the hinge boss 14 to receive therethrough a pin member 18. The pin member 18 may be threaded or unthreaded as desired.

The rear body portion 12 has a pair of spaced apart diametrically opposed hinge bosses 20 and 21 located at the rear thereof. The tail portion 13 includes a hinge boss 22 of axial extent sufficient to fit between the hinge bosses 20 and 21. A pin 23 passes through the hinge bosses 20, 21 and 22 to pivotally secure the tail portion 13 to the rear body portion 12.

The pivotal connections between the front body portion and the rear body portion, and the rear body portion and the tail portion provide means to enable the lure to undulate as it is pulled through the water. Also, when the pins 18 and 23 are removed as shown in FIG. 1 the fish lure can be broken-down for storage in a small space.

Most advantageously, the front body portion 11 is formed of a structural member having a web portion 30 positioned substantially vertically with respect to the orientation of the fish lure and terminates at the top portion thereof in a flange 31. A second flange 32 is located near the bottom marginal edge of the web 30. The cross-sectional configuration of the front body portion 11 is best seen in FIG. 4 and is seen to be substantially I-shaped, or what may be referred to as a modified I-beam configuration. The front body portion has a depending web extension 33 which extends downwardly from the fish body and forms the lower marginal edge of the web. While the lower flange 32 is shown positioned above the web extension portion 33 it will be understood that the flange may be located precisely at the edge of the web to conform to an I-type cross-section.

A pair of bosses 35 and 36 are formed at a head portion of the front body 11 and are positioned on the body portion at a location substantially to conform to the eye position of a small bait fish. Therefore, while the boss has a structural purpose, to be described herein below, it has an aesthetic quality which makes the fish lure conform more exactly to a live bait fish. An arcuately shaped slot 40 is positioned beneath the boss member 36.

As best seen in FIG. 3 a diving plane 41 has slot 42 formed therein so as to be positioned over the web portion 30 of the front body 11. A pair of spaced apart boss members 43 and 44 are formed on the diving plane 41 and located to be at the arcuate center line of the slot 40. A clamping screw 46 is inserted through one of the boss members 43, 44 and threadedly fastened to the other of the boss members. Here the boss member 44 is illustrated as having a clearance hole to receive the screw 46 while the boss member 43 is provided with threads. The diving plane 41 has a wide opening 47 with diametrically opposed and spaced apart pin members 48 and 49. The pins 48 and 49 are dimensioned and located to be inserted into openings formed within the boss members 35 and 36. The diving plane is pivotally secured to the boss members 35 and 36 and locked in any desired position by clamping the diving plane to the web member 30 with the screw 46.

The rear body portion 12 is also substantially I-shaped in the cross-section, as best seen in FIG. 5, and has a web portion 50 having a flange portion 51 formed at the top thereof. In this instance, the flange portion 51 is formed by a chamber with one side 52 thereof open. A cover plate 53 is secured to the open side to form an airtight flotation chamber 55. The size of the flotation chamber 55 may vary from one lure design to another. Basically, the chamber 55 is provided to maintain the lure in a generally horizontal attitude when submerged, and to give the lure a predetermined sinking rate. Of course, with various sizes and types of lures, the size of the chamber 55 will have to be adjusted. If need be, depending on the size of the lure, weights may be added to the chamber 54 to ballast the fish lure in any desired manner. Also the fish lure may have a chamber formed on the botton of the rear body portion. The bottom portion of the web 50 is provided with a flange 56 near the bottom marginal portion 57 thereof. Here also the flange 56 may be located at the terminating edge of the marginal portion 57 to conform to an I cross-section.

The tail portion 13 has a web 60 and a flange 61 and is substantially T-shaped in the cross-section, as best seen in FIG. 7. The forward portion of the tail section has a lower flange 62. However, it will be understood that the cross-section of the tail portion 13 can be I-beam shaped throughout its entire length if desired.

In the illustrated embodiment a pair of rear fins 63 and 64 are located at the top and bottom, respectively, of the fish lure 10. Preferably, the fin 63 is attached to and formed integrally with the tail portion 13 while the fin 64 is attached to and/or formed integrally with the rear portion 12. This would cause the fins to move independent of one another and more accurately portray the movement of a bait fish. A plurality of fish hooks 66 are secured to the lower marginal edge portions 33 and 57. In the illustrated embodiment the fish hooks are treble hooks but it will be understood that single or double hook units may be used.

Referring now to FIGS. 7 and 8 a novel feature of the fish lure construction of this invention is more clearly shown. The rear body portion 12 is provided with underlying flange portions 70 and 71 which are positioned beneath the flange portion 31 of the front body portion 11. Tapered edges 72 and 73 are provided at the rear of the flange 31 and are spaced a predetermined distance from a rear wall portion 74 of the chamber forming flange 51. The angled portions 72 and 73 provide limited movement between the body portions 11 and 12 as the fish lure is pulled through the water. Furthermore, the underlying flanges 70 and 71 substantially completely close the gap between the body portions 11 and 12 so that when viewed from the top or bottom, as seen in FIG. 7, the fish lure more accurately resembles that of a live bait fish. The bottom flange 32 has angled portions 77 and 78 formed at the rear thereof and are in substantial longitudinal alignment with the perpendicular edge portions 79 and 80 of the lower flange 56, as best seen in FIG. 1. The angled portions 77 and 78 also abut the edges 79 and 80, respectively, as the body portions 11 and 12 move relative to one another through their entire extent of travel.

The flange 51 has rear tapered wall portions 82 and 83 which abut edge portions 84 and 85, respectively, of the flange 61 when the tail portion 13 moves relative to the rear body portion 12 through its extent of travel. The lower flange 56 has tapered rear portions 90 and 91 which engage the flange portion 62 of the tail 13 as it moves from side to side.

The I-shaped, or substantially I-shaped cross-section of the body portions 11 and 12 and the I-shaped and T-shaped cross-section of the tail portion 13 provide a fish lure which appears from all angles to be substantially a full-bodied bait fish. The construction of the lure is such that a large fish lure can be made relatively light and thus can be cast easily, and in addition affords minimum resistance as it is pulled through the water.

It should be realized that the lure is shown in the unpainted condition, which was done for purposes of illustration. In actual practice, the lure would be fabricated and painted to resemble a young bait fish. Further in this regard, while the illustrated embodiment is that of a three-piece articulated design, the invention is not limited thereto. More specifically, the lure may be of a two-piece construction, or of a one-piece construction when designed to resemble smaller bait fish. Accordingly, while a single embodiment of this invention has been illustrated herein, it will be understood that variations and modifications may be effected without departing from the spirit and scope of the novel concepts disclosed and claimed herein.

The invention is claimed as follows:

1. A fish lure, comprising head, body and tail portions in the general configuration of a bait fish, the improvement wherein, at least said body portion includes a web portion positioned along a vertical axis of the fish lure and extending along the length of said body portion, and flange means secured to said web portion and extending in diametrically opposed directions from said web portion, whereby said web and flange portions provide reduced cross-sectional area and weight to the fish lure while providing a full-bodied appearance for the fish lure.

2. A fish lure as defined in claim 1 wherein said lure is of a one-piece construction, said head, body and tail portions being formed on a single element.

3. A fish lure as defined in claim 1 wherein said lure is of a three-piece construction, said respective pieces being joined together for articulated movement by joint means.

4. A fish lure as defined in claim 3 wherein each said pieces includes a vertical web portion, and flange segment extending in diametrically opposed directions from said web portion.

5. The fish lure as set forth in claim 1 wherein said body portion is formed of front and rear body portions, a first articulation means joining said front and rear body portions together to provide relative movement therebetween.

6. A fish lure, comprising head, body and tail portions, said body portion including front and rear sections with an articulated joint means joining said sections for relative movement, the improvement wherein, at least said body portion includes a web portion positioned along a vertical axis of the fish lure and extending along the length of said body portion, and flange segments secured to said web portion and extending in diametrically opposed directions from said web portion, whereby said web and said flange segments provide reduced cross-sectional area and weight to the fish lure while providing a full-bodied appearance for the fish lure, and wherein at least one of said front and rear body sections has the flange segment thereof provided with a tapered portion immediately adjacent said articulation means to prevent interference between said flange segments of said front and rear body sections, and wherein the other of said front and rear body sections has the flange segment thereof extending beneath said tapered portion to conceal a gap between said front and rear body sections, thereby insuring said full-bodied appearance of said fish lure from all angles.

7. A fish lure, comprising head, body and tail portions, said body portion being formed of front and rear sections joined by an articulated joint to provide for relative movement, at least said body portion includes a web portion positioned along a vertical axis of the fish lure and extending along the length of said body portion, and flange segments secured to said web portion and extending in diametrically opposed directions from said web portion, whereby said web and said flange segments provide reduced crosssectional area and weight to the fish lure while providing a full-bodied appearance for the fish lure, and one or the other of said front and rear sections including flotation means formed integral with the flange segment thereof.

8. The fish lure as set forth in claim 7 wherein said flotation means formed in said rear body portion and includes a flotation chamber having spaced apart vertically disposed bottom and top walls, and an integral side wall formed along one side thereof and an attachable side wall formed on the other side thereof, thereby enabling said chamber to receive ballast means.

9. The fish lure as set forth in claim 8 wherein said attachable side wall is a cap member secured over the opening provided by said spaced apart top and bottom walls.

10. A fish lure, comprising head, body and tail portions, the improvement wherein, at least said body portion includes a web portion positioned along a vertical axis of the fish lure and extending along the length of said body portion, and first flange segments secured to said web portion and extending in diametrically opposed directions from said web portion, and second flange segments extending in diametrically opposed directions from said web portions, said first and second flange segments being spaced from each other whereby said body portion has a generally I-shaped configuration in cross-section, whereby said web and flange portions provide minimum cross-sectional area and weight to the fish lure while providing a full-bodied appearance for the fish lure.

11. A fish lure, comprising head, body and tail portions, wherein, at least said body portion includes a web portion positioned along a vertical axis of the fish lure and extending along the length of said body portion, and flange segments secured to said web portion and extending in diametrically opposed directions from said web portion, whereby said web portion and said flange segments provide minimum cross-sectional area and weight to the fish lure while providing a full-bodied appearance for the fish lure, said body portion being formed of front and rear body sections, a first articulation hinge joining said front and rear body sections together to provide relative movement therebetween, at least one of said front and rear body sections having the flange segments thereof angled away from said first articulation means to enable said front and rear body sections to pivot about said first articulation means a predetermined distance, the other of said front and rear body sections being provided with an extended portion to extend beyond said tapered portion to conceal a gap formed thereby, a second articulation means joining said rear body section to said tail portion together to provide relative movement therebetween, said tail portion including a web portion positioned along the vertical axis thereof and extending longitudinally thereof the distance defined by said tail portion, and flange segments secured to said web portion of said tail portion and extending in diametrically opposed directions, and flotation means formed integrally with said rear body portion.

12. The fish lure as set forth in claim 11 wherein said front and rear body portions are provided with second flange segment extending in diametrically opposed directions from said web portion, said first and second flange segment providing an I-shaped cross-sectional configuration of said fish lure, whereby said fish lure provides a reduced cross-sectional area and weight and a full-bodied appearance to the fish lure.

* * * * *